(12) United States Patent  
Bailey et al.

(10) Patent No.: US 6,963,981 B1  
(45) Date of Patent: Nov. 8, 2005

(54) METHOD AND APPARATUS FOR REMOTE INSTALLATION OF AN OPERATING SYSTEM OVER A NETWORK CONNECTION

(75) Inventors: R. Andrew Bailey, Somerville, MA (US); Leonard T. Giambrone, Somerville, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 541 days.

(21) Appl. No.: 10/059,729

(22) Filed: Jan. 29, 2002

Related U.S. Application Data

(60) Provisional application No. 60/264,886, filed on Jan. 29, 2001.

(51) Int. Cl.[7] ............................................. G06K 19/06
(52) U.S. Cl. ...................................................... 713/200
(58) Field of Search ......................................... 713/200

(56) References Cited

U.S. PATENT DOCUMENTS 5,887,163 A * 3/1999 Nguyen et al. ................ 713/2
6,678,712 B1 * 1/2004 McLaren et al. ............ 718/100
6,763,458 B1 * 7/2004 Watanabe et al. ........... 713/100

\* cited by examiner

Primary Examiner—John R. Cottingham
(74) Attorney, Agent, or Firm—David H. Judson

(57) ABSTRACT

A method for remote installation of a target operating system is carried out on a machine operating a source operating system. In one embodiment, it is presumed that the source operating system was booted from a first bootable region of a storage associated with the machine. According to the method, a copy of the source operating system together with the target operating system are delivered to the machine and stored in a second bootable region of the storage. The copy of the source operating system may be stored in a first partition of the second bootable region of the storage, and the target operating system may be stored in a second partition of the second bootable region. A boot loader is then configured to boot the copy of the source operating system from the second bootable region of the storage. The machine is then re-booted. At this point, the machine is still running the source operating system, although in this case that operating system was booted from the second bootable region of the storage. The original source operating system (from the first bootable region) is then removed, and the boot loader is re-configured to boot the target operating system from the second bootable region of the storage. The machine is then re-booted again, after which the target operating system is operational. In one embodiment, the first and second bootable regions may be separate hard disks, and the source and target operating systems are Linux and Windows, or vice versa.

18 Claims, 7 Drawing Sheets

METHOD AND APPARATUS FOR REMOTE INSTALLATION OF AN OPERATING SYSTEM OVER A NETWORK CONNECTION

RELATED APPLICATIONS

This application is related to U.S. provisional application 60/264,886, filed Jan. 29, 2001, and hereby incorporates by reference such application in its entirety.

BACKGROUND OF THE INVENTION

1. Field

The described apparatus and method relates generally to high availability computers and, in particular, to methods for secure, unattended installation of operating systems for such machines. In particular, the current invention is directed to an unattended and secure installation of an operating system over a computer network.

2. Description of the Related Art

An operating system often is the most critical piece of software in a computer system as it is the software that controls the allocation and usage of hardware resources, such as memory, central processing unit time, disk space, and peripheral devices. Typically, an operating system provides a "platform" by exposing application programming interfaces (APIs) that applications use to call upon the operating system's underlying software routines to perform functions.

The most common operating systems are proprietary systems such as Microsoft Windows and Windows 2000 (formerly known as Windows NT), and systems based on open source such as Linux. Typically, an operating system executes on standard off-the-shelf hardware such as an Intel-based processor.

Operating system installation techniques are well known in the art. Representative patents include U.S. Pat. Nos. 6,128,734, 5,325,532, 5,758,165, 5,142,680, 5,280,627, and 5,452,454. The '734 patent, issued to Gross et al., is representative. There, a computer system is upgraded while the computer system is functioning. In particular, the computer system has a first boot device with a first operating system, and a second device. The second device is prepared within the computer system as a bootable device while the computer system is functioning under control of the first operating system. In particular, the second device is prepared to receive a second operating system. The second operating system is loaded onto the second device while the computer system is functioning under control of the first operating system. Thereafter, the computer system is rebooted. Upon reboot, the computer system is under control of the second operating system on the second device.

While the installation technique shown in the '734 is advantageous, remote operating system installation raises difficult challenges. In general, of course, any corruption of an operating system is problematic, but the matter is exacerbated when the machine is remotely located and/or otherwise not readily available by direct physical access. This situation may arise, for example, when the machine is located in a third party premise. Remote installation of an operating system may also involve the destruction of the pre-existing operating system. Of course, when a then-current operating system is corrupted, the options for remote repair or replacement are generally very limited in scope.

Further, even when the operating system kernel is not corrupted or damaged, the mere replacement of one operating system with another may cause instability of the platform. For example, if operating system A is completely replaced with operating system B while operating under operating system A (as described, for example, in the '734 patent) a new set of scripts, procedures, and/or executables may need to be implemented.

In this manner, many typical networked computing devices running operating systems and methods of remote installation of the same suffer one or more shortcomings. Many other problems and disadvantages of the prior art will become apparent to one skilled in the art after comparing such prior art with the present invention as described herein. Other aspects, advantages, and novel features of the present invention will become apparent from the detailed description of the invention when considered in conjunction with the adaptively clocked accompanying drawings.

BRIEF SUMMARY OF THE INVENTION

According to the invention, a method for remote installation of a target operating system is carried out on a machine operating a source operating system. In one embodiment, it is presumed that the source operating system was booted from a first bootable region of a storage associated with the machine. According to the method, a copy of the source operating system together with the target operating system are delivered to the machine and stored in a second bootable region of the storage. The copy of the source operating system may be stored in a first partition of the second bootable region of the storage, and the target operating system may be stored in a second partition of the second bootable region. A boot loader is then configured to boot the copy of the source operating system from the second bootable region of the storage. The machine is then re-booted. At this point, the machine is still running the source operating system, although in this case that operating system was booted from the second bootable region of the storage. The original source operating system (from the first bootable region) is then removed, and the boot loader is re-configured to boot the target operating system from the second bootable region of the storage. The machine is then re-booted again, after which the target operating system is operational. In one embodiment, the first and second bootable regions may be separate hard disks, and the source and target operating systems are Linux and Windows, or vice versa.

Preferably, the copy of the source operating system and the target operating system are delivered to the machine in a "packed" (i.e., compressed) form. In such event, the copy of the source operating system is preferably unpacked (i.e., decompressed) prior to being stored in the first partition. The target operating system preferably is stored in the second partition in the packed form. When the machine is re-booted initially, the target operating system is unpacked onto the second partition.

According to another technical advantage of the present invention, network configuration data used by the source operating system is preserved during the installation process to enable the machine (executing the target operating system) to be reached at the same network address used by the machine (executing the source operating system). Likewise, given security data (e.g., access control lists, keys, or the like) are preserved during the process to enable the machine (executing the target operating system) to implement one or more security settings used by the machine (executing the source operating system). Thus, installation of the new operating system does not necessarily require new network configuration and/or access controls to be implemented.

In an illustrated embodiment, the machine on which the remote installation is carried out is a content server or "surrogate" used in a content delivery network (CDN). In this embodiment, the copy of the source operating system and the target operating system are delivered to the CDN server over the CDN.

Other aspects exist in a method of replacing a first operating system executing on a server having first and second storage disks, and the first operating system is booted from the first storage disk. A packed version of the first operating system and a packed version of a second operating system which are desired to be installed on the server are received from a remote location.

The first operating system is unpacked onto a first storage partition of the second disk. A packed version of the second operating system is stored onto a second storage partition of the second disk. The server is remotely re-booted under the first operating system, operating from the first storage partition of the second disk.

The first operating system is removed from the first disk. The second operating system is unpacked onto a partition on the first disk. The server is then remotely re-booted under the second operating system, operating from the partition on the first disk.

The aspects, components, and features of the method and the any apparatus depicted or described should be construed as capable of being transferred from one to another. Other aspects, advantages, and novel features of the present invention will become apparent from the detailed description of the invention when considered in conjunction with the accompanying drawings.

DETAILED DESCRIPTION OF THE PREFERRED EMBODIMENT

FIGS. 1 through 4 are schematic block diagrams of a target system showing a replacement of an operating system over a remote link, according to an aspect of the invention.

Figure 1:
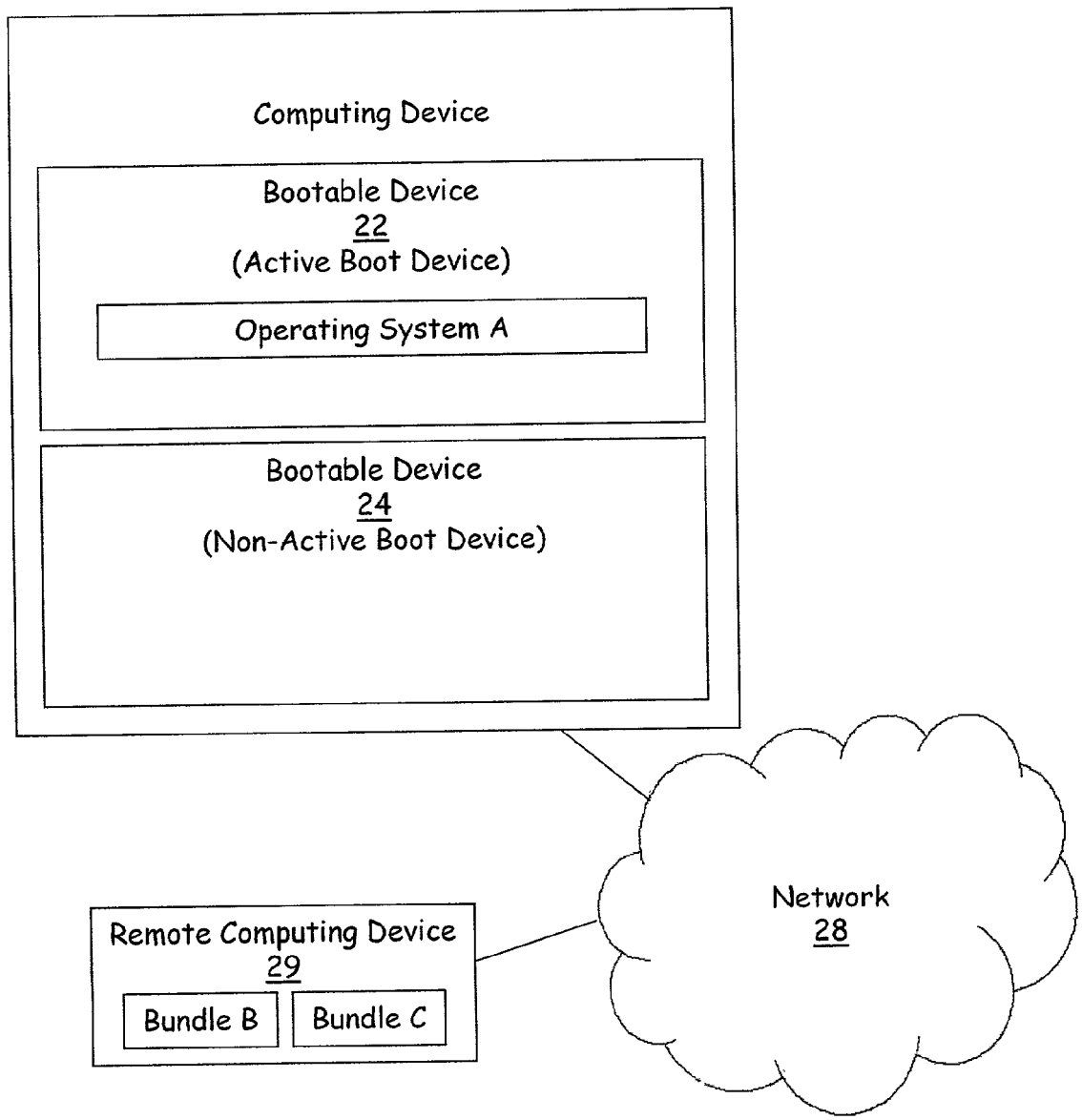
FIGS. 1–4 are schematic diagrams detailing the replacement of an operating system over a network connection.

FIG. 1 is a schematic block diagram detailing a computing device prior to the initiation of the remote and secure replacement of the operating system contained therein. In this case, a computing device 20 contains persistent writable memory media 22 and 24. This persistent memory may be magnetic in nature, such as a magnetic disk, semiconductor memory, such as a flash memory, non-volatile memory, or any combination of the like.

In the preliminary stage, the media contains instructions for operating the computing device, known as an operating system. The computing device 20 is operating under an operating system A at the beginning of the replacement.

The persistent memory media 22/24 may be any media that can contain digital data readable by the computing device 20, writable, and non-volatile in nature. The non-volatile nature of the media allows the computing device to be cycled or rebooted with no loss in the stored contents of the media 22/24.

In a specific aspect, this non-volatile media is random access in nature, and may be indexed according to some particular scheme. For example, in the case of magnetic media, it may be indexed to a file structure, or it could be memory mapped in nature. In the case of non-volatile memory, it could be accessible to the computing device thorough a read of a particular memory address space.

The media may be uniform in nature, or it may be comprised of several different media. In the case of magnetic disks, the media may also be several physical media or a single physical medium. In either case, the physical media may also have logical media associated with them, such as a disk partition or plurality of partitions. In practice, the computing device 20 should be able to boot from the media device 22 or the media device 24.

In particular, the computing device 20 should have a plurality of media device from which the computing device 20 can boot. For example, the media device 22 may be a logical physical media, subdivided from a single physical device. Or, the media device may contain a plurality of physical device, the single physical devices optionally partitioned or not.

Or, the media device may be a composition of physical magnetic devices with non-volatile memory devices. In this case, the computing device may be bootable from any logical partitions of the magnetic device(s), or from the non-volatile memory device.

In any case, a bootable device is any media that stores electronic information, where the electronic information is readable by the computing device 20. Further, the computing device 20 may alter the information stored on the bootable device, and the bootable device may be used to start the computing device to run under an operating system contained in it. In the case of FIG. 1, the active bootable device contains the operating system A, and the computing device 20 is running under operating system A.

In the present conception, bundles of information are stored remotely form the computing device 20. The bundles of information are stored on a remote computing device 29, communicatively coupled to the computing device 20 through a network 28.

The network 28 can take various forms. This includes a local area network connection (LAN), or through interconnected networks, such as the Internet. The network may be coupled through any combination of wired or wireless connections.

The bundle of information contains the necessary information to run the computing device 20 under an operating system. The information may exist as one bundle, or as multiple bundles on the remote computing device 29. The information may also may exist as multiple bundles spread among a plurality of remote computing devices, similar to that depicted by remote computing device 29.

The bundles contain the information necessary to run the computing device 20 under an operating system B and an operating system C. The information for operating system B may be contained in one or more bundles, as may be the information for operating system C. Or, the information for operating system B and operating system C may be intermingled, separated from one another, contained in one bundle, or contained in several bundles across several different remote computing devices.

The bundles may be compressed and/or encrypted. The compression saves on transmission times, and the encryption allows the bundles to be transmitted securely.

Figure 2:
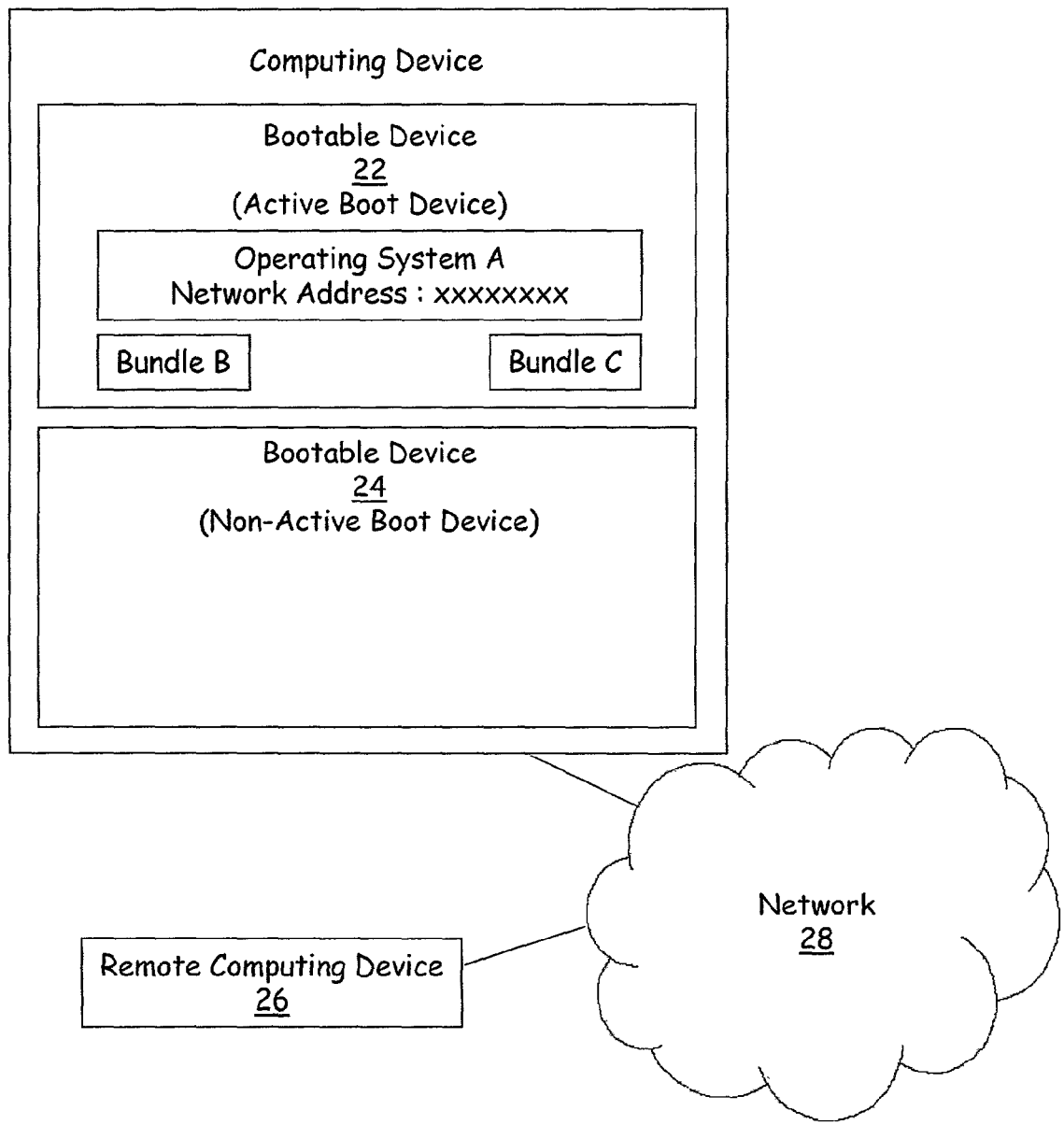

In an implementation, shown in FIG. 2, the computing device 20 retrieves the bundle or bundles of information containing the information on operating system B and operating system C. The computing device 20 then stores the retrieved bundles on one of the bootable media.

In this implementation, the bundles have been retrieved together and stored on one bootable device. It should be noted that the storage of any particular bundle may be on any persistent media associated with the computing device 20, and the storage of the bundle or bundles on the first medium containing the running operating system is only exemplary.

Figure 3:
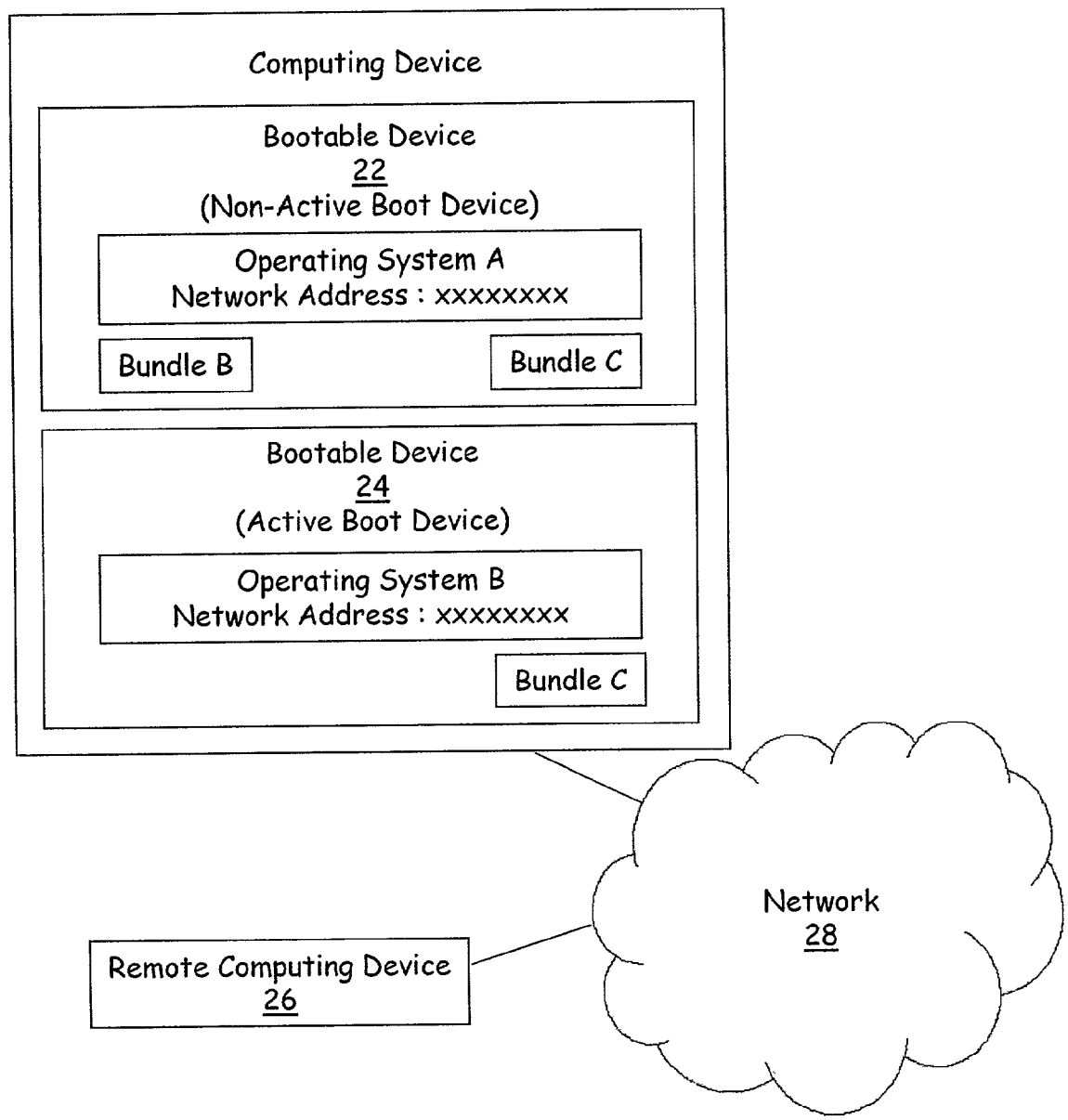

In FIG. 3, the computing device 20 prepares the second bootable media with a copy of operating system B. As such, operating system B is installed in the second media. The operating system B is then configured with configuration parameters associated with the computing device 20. These configuration settings include such things as network configuration and system security configurations. In this manner, the operating system B will be configured to respond to network requests much like the computing device 20 as it stands running the current operating system A.

Additionally, the information relating to operating system C is installed on the second media. Thus, the computing device 20, when running under the operating system B, will be able to retrieve the information sufficient to install the operating system C on a persistent bootable media. The second media is then denoted as being the runtime system. In this manner, when the computing device 20 is booted, it will boot under the control of operating system B, running from the second bootable media.

It may be noted that the download of the information regarding operating system C may take place anytime after the configuration of the second media for running the operating system B. In fact, the placement of the bundle of information relating to operating system C may take place after the computing device 20 is rebooted and running operating system B.

In FIG. 3, the computing device 20 is rebooted. Thus, the machine is running under the operating system B when rebooted. The computing device 20 then unpacks the information regarding operating system C onto another bootable media. In this case, the information relating to operating system B is unpacked onto the bootable media that had the operating system A placed on it.

However, one should note that the media onto which the operating system C is unpacked may be the bootable media containing the operating system A, or another bootable device. In the present case, the operating system C is unpacked onto the bootable media 22. The bootable media 22 containing the configuration for running the computing device 20 under operating system C is then designated as the boot media.

Figure 4:
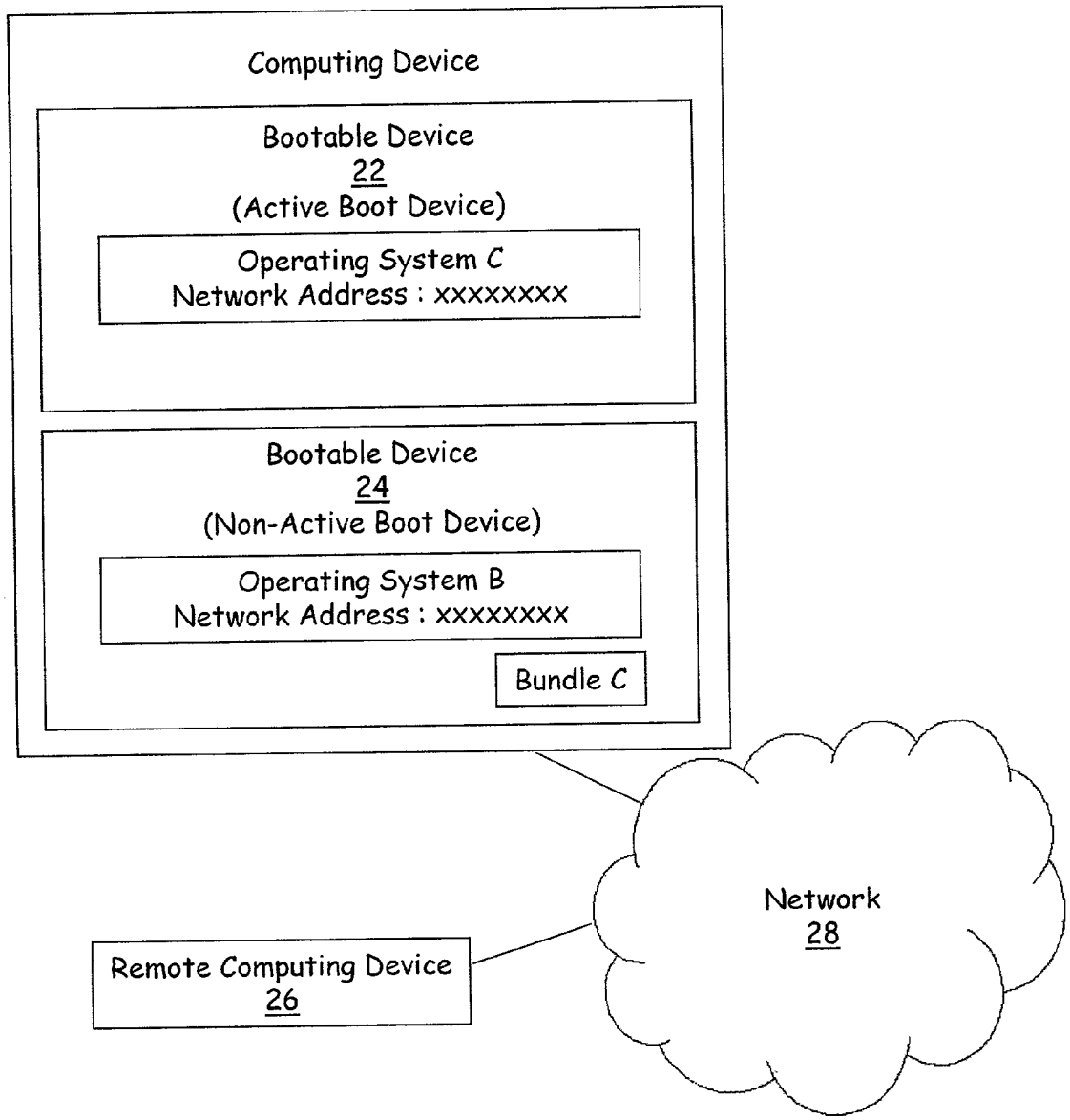

When the computing device 20 is rebooted, as shown in FIG. 4, the operating system C is now operational on the system. In addition, the bootable device containing the configuration for running the operating system B is still present on the system. If, for any reason, the operating system C is corrupted, or if the operator wishes to change the operating system C to another operating system, they may do so in a reasonable fashion.

In particular, to accomplish this, the media configured for running operating system B is designated as the boot device. In terms of replacing a corrupt operating system C, the original bundle to recreate the operating system C is still present on the media that is configured to run operating system B. When the computing device 20 is rebooted using operating system B, the same procedure may be followed to replace the corrupted operating system C with the new version. In this manner, a reproducible system replacement may be performed.

Should an alternative system be warranted, the computing device 20, rebooted under operating system B, may request that bundles of information relating to an operating system D be delivered. In this case, the computing device 20, running under operating system B, would place the operating system D on any of the bootable devices, and designate that particular bootable device as the boot device on start up. In this manner, multiple operating systems may be stored for quick and easy placement on the computing device 20.

It should be noted that many different means may be employed in the various steps mentioned with respect to FIGS. 1 through 4. In particular, any or all the steps may be implemented through a script that is downloaded to the computing device 20 from any remote source, such as a remote computing device 26. Or, the computing device 20 may be controlled through the remote control direction from the remote computing device 26. Or, the steps may be performed in any combination of downloaded scripting techniques, downloadable executables, downloadable platform independent modules, such as exemplified by the JAVA language, or remote control software that allows an operator of the remote computing device 26 to direct the operation of the computing device 20 through a remote connection. In fact, scripts or executables downloaded to and operating locally on the computing device 20 may replace or enhance the remote commands mentioned above.

The remote computing device 26 may contain one or all the bundles relating to the various operating systems. Thus, the remote computing device 26 and the remote computing device may be the same device.

Additionally, the functionality of the remote computing device may be spread out among several computing devices Thus, the use of multiple remote computing devices is possible in the exercise of this description.

Figure 5:
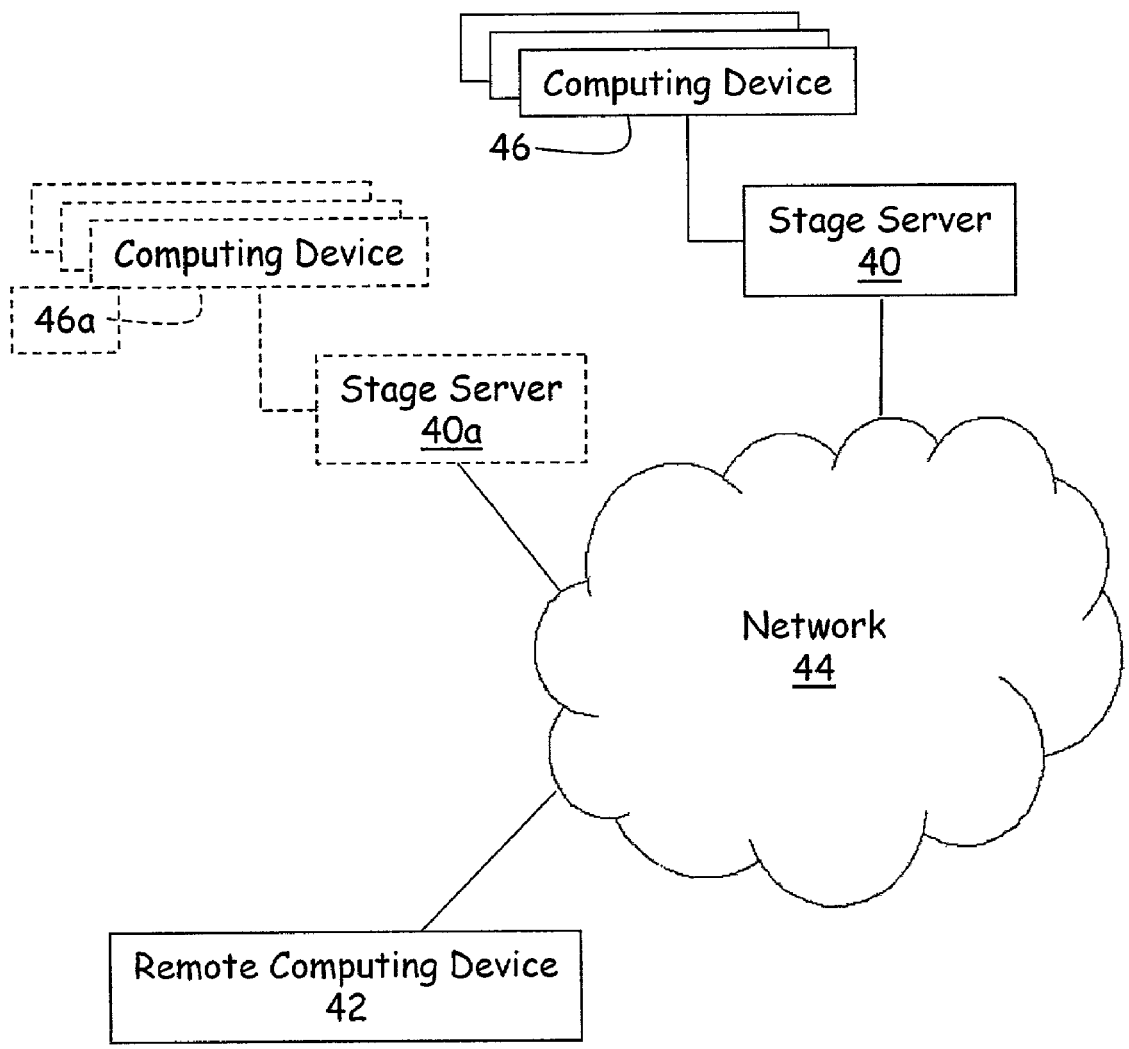
FIG. 5 is a network schematic diagram detailing the role of an intermediate stage server assisting the replacement of an operating system over a network connection.

FIG. 5 is a network schematic diagram of one specific use of the application. In this case, a farm of computing devices 46 is co-located at one location. Communicatively coupled to the computing devices is a stage server 40. The stage server is communicatively coupled to a remote computing device 42 through a network connection 44. This network connection 44 may be any form of connection, including a LAN connection or a connection through an interconnected network, such as an Internet. In response to a command, the bundles of information relating to operating system B and/or operating system C are stored on the stage server 40. Thus, the download time to any individual computing device within the computing device farm 46 is minimized, due to the lack of network overhead.

In fact, multiple computing device farms may be served in a timely fashion. It should be noted that the system of the computing device farm 46 and the stage server 40 may be multiplied many times, each at another location. This is denoted by the stage server 40a and the computing device farm 46a. In this manner, the number of interconnections between a remote computing device 42 and the computing devices to be reconfigured is not excessive, and the number of requests of the remote computing device 42 may be minimized. It should be noted that the stage server 40 may also function in the promulgation of command scripts or remote command initiation, described previously.

It should also be noted that the operating systems involved, namely operating system A, operating system B, and operating system C need not be differing. In fact, operating system A and operating system B may be the same type of operating system. Or, they may be the same type of operating system, but with the functionality of operating system B curtailed in order to minimize the space taken for the stored bundle of information and installation on the bootable device. Or, any combinations of operating system A, operating system B, or operating system C may have the relationships described above.

An exemplary method that performs the functionality of the invention described in accordance with the previously related Figures is now described. In general, the scope of the envisioned system contains several components and steps. First, the system has a control program operated by the installer. The installer runs the process or processes in which the specific target operating systems are place on the computing system, and eventually configured.

The target system is slated to have two software operating systems installed. A first operating system is the base operating system used to carry out the remote installation process. This base operating system may be used subsequently to repair the final installed operating system that the computing device is running under, install a newer version of the installed operating system, or replace the installed operating system with a brand new operating system. The base operating system has access to data that correspond to any of the above-mentioned conditions.

Thus, when the installed operating system is inaccessible, or the user wishes to reconfigure the computing device to run a new operating system, the base operating system has the functionality and capability to do so. This may be accomplished without any reconfiguration, aside from the reboot of the computing system into the base operating system.

This feature allows for stable development platforms and operating environments in subsequent processes. In this manner, nuances of newer operating systems are minimized for purposes of reconfiguration and/or repair.

A second operating system is the target operating system. This second operating system is intended to be system ultimately operating by the target server, but is not actually used by the installation process.

The target-computing device is assumed to contain at least two bootable devices, as detailed above. In exemplary embodiments this may be a single hard disk drive capable of being subdivided into multiple discrete partitions. The target-computing device is preconfigured with a copy of a current operating system on the current bootable device. This operating system may or may not be similar or of the same type as either the first or second operating system.

The target-computing device is attached to a network. This provides network connectivity. The network connectivity may be through an interconnected network, and thus the target-computing device would be accessible through a valid IP network address.

In the installation process, an operator executes a control program. This control program may be remotely activated, or may be automatically activated through downloaded scripts, executables, or the like. The control program may take the form of several interlinked control programs working in coordination.

The control program first prepares bundles for transmission. A system can generate one or more installation bundles. Or, the bundles can be pre-generated and simply be awaiting transmission by the control program.

These bundles contain all the operating systems' constituent files. They may be compressed or otherwise, encrypted, or non-encrypted.

The bundles may be one bundle for each operating system. Or, they may be several bundles for each operating system, or one or more bundles with the operating system information intermixed.

In one aspect, the bundles are transmitted to locations available to servers connected to the public Internet. More particularly, these bundles may be placed on an Internet World Wide Web server, or a stage server.

The method then continues when the bundles are fetched. The installer, or other control mechanism, selects the computing device or devices for installation with the first operating system.

In one aspect, a command is executed remotely, via a secure IP communications channel between the installer's computer and the target machine(s), to retrieve the installation bundles via HTTP from the stage-server. or, the command may be executed locally through some script or executable.

Next, the second operating system is installed on a second bootable device. In one case, after the installation bundles are retrieved, a series of commands are executed remotely on the target computing device or devices, possibly reusing the same secure communications channel. As before, these commands may be run as the result of a downloaded script or executable.

The first operating system is installed on the second bootable device. The bundle containing the second operating system is placed onto the second drive as well.

The parameters and settings of the computing device are recorded. These settings can include the network configuration of the target machine, including the IP networking settings, and security settings used to control access to the machine via the secure channel.

If the first operating system installed is of the same type as the original operating system, the first operating system on the second bootable device may be easily configured with these same settings. Scripts may be used to configure dissimilar operating systems. This is done so that the computing device will operate under the same parameters when rebooted under the first operating system.

The target system's boot loader is then modified to boot the first operating system from the second bootable device. Next a command is issued to cause the target system to reboot. This may be done remotely across the network, possibly over the secure communications channel. Or, scripts or executables on the target system may perform the same function. In any case, when the computing device is rebooted, it will be running the first operating system from the second bootable device.

The first operating system can be configured to execute a script at boot time. The script may proceed to remove the any previously used boot devices, such as disk partitions, or to remove the original operating system from the original bootable device.

Next, the second operating system is installed on another bootable device. This device may be the original bootable device, or another. The bundle containing the second operating system is exploded onto the target bootable device.

Again the network configuration of the target machine is recorded, as described above. These configuration settings can be stored in configuration files on any of the devices readable. These are used to impart the network configuration and other operating parameters to the second operating system.

Thus, when the computing device is rebooted and running the second operating system, it can be reached at the same TCP/IP address. Additionally, it will have the same operational characteristics used earlier by the first operating system.

The system boot-loader is reconfigured to boot the second operating system. Then, a script, or remote command reboots the server.

In this case, the computing device is now running the second operating system. The second bootable device now contains a functional first operating system. Additionally, the bundles are preserved for future reversals.

This process allows for reversal when some other type of operating system is required on the system. Or, the system may be used to repair the second operating system due to corrupted files.

To accomplish this, a script or remote command can be executed to cause the system boot loader to be modified to once again boot the first operating system. The command then causes the system to restart and boot.

In more particular detail, the operation of a specific exemplary embodiment is now described. A technique is envisioned for deploying an operating system over a computer network onto machines that are already deployed and operating in the network, typically with a different operating system.

In a representative embodiment, the computer network is a content delivery network (CDN) in which a large number of geographically distributed content delivery nodes are arranged for efficient delivery of content (e.g., Web content, streaming media and software applications) on behalf of third party content providers. Typically, a CDN is implemented as a combination of a content delivery infrastructure, a request-routing mechanism, and a distribution infrastructure. The content delivery infrastructure usually consists of a set of "surrogate" origin servers that are located at strategic locations (e.g., Internet network access points, Internet Points of Presence, and the like) for delivering copies of content to requesting end users.

Figure 6:
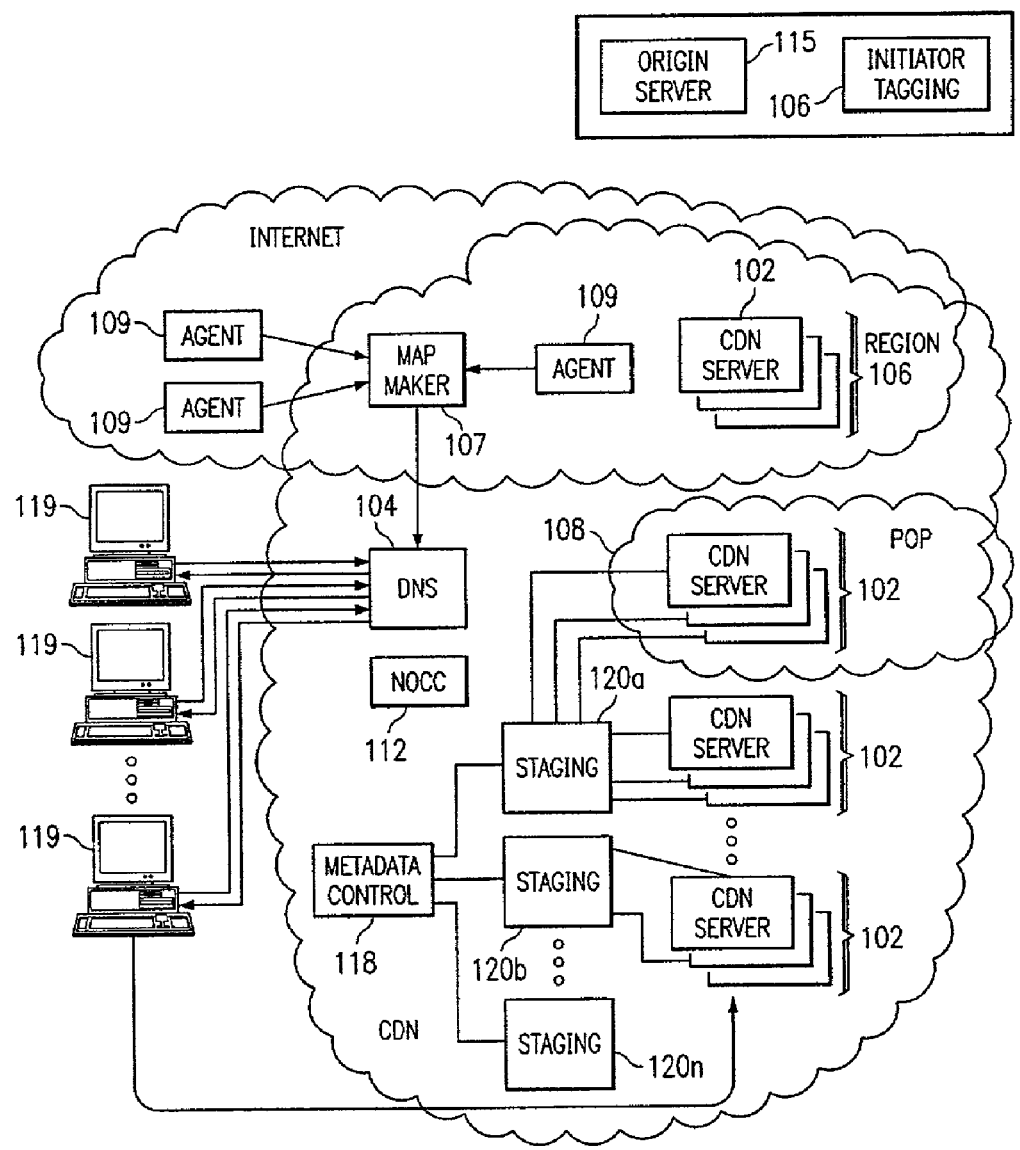
FIG. 6 is a representative content delivery network (CDN) in which the present invention may be implemented.

As seen in FIG. 6, an Internet content delivery infrastructure usually comprises a set of "surrogate" origin servers 102 that are located at strategic locations (e.g., Internet network access points, and the like) for delivering copies of content to requesting end users 119. The request-routing mechanism 104 allocates servers 102 in the content delivery infrastructure to requesting clients in a way that, for web content delivery, minimizes a given client's response time and, for streaming media delivery, provides for the highest quality. The distribution infrastructure consists of on-demand or push-based mechanisms that move content from the origin server to the surrogates. A CDN service provider (CDNSP) may organize sets of surrogate origin servers as a "region." In this type of arrangement, a CDN region 106 typically comprises a set of one or more content servers that share a common backend, e.g., a LAN, and that are located at or near an Internet access point. Thus, for example, a typical CDN region may be co-located within an Internet Service Provider (ISP) Point of Presence (PoP) 108. A representative CDN content server is a Pentium-based caching appliance running an operating system (e.g., Linux, Windows NT, Windows 2000) and having suitable RAM and disk storage for CDN applications and content delivery network content (e.g., HTTP content, streaming media and applications). Such content servers are sometimes referred to as "edge" servers as they are located at or near the so-called outer reach or "edges" of the Internet. The CDN typically also includes network agents 109 that monitor the network as well as the server loads. These network agents are typically co-located at third party data centers or other locations. Map maker software 107 receives data generated from the network agents and periodically creates maps that dynamically associate IP addresses (e.g., the IP addresses of client-side local name servers) with the CDN regions. In one type of service offering, known as Akamai FreeFlow, from Akamai Technologies, Inc. of Cambridge, Mass., content is tagged for delivery from the CDN using a content migrator or rewrite tool 106 operated, for example, at a participating content provider server. Tool 106 rewrites embedded object URLs to point to the CDNSP domain. A request for tagged content is resolved through a CDNSP-managed DNS to identify a "best" region, and then to identify an edge server within the region that is not overloaded and that is likely to host the requested content. Instead of using content provider-side migration (e.g., using the tool 106), a participating content provider may simply direct the CDNSP to serve an entire domain (or subdomain) by a DNS directive (e.g., a CNAME). In such case, the CDNSP may provide object-specific metadata to the CDN content servers to determine how the CDN content servers will handle a request for an object being served by the CDN. Metadata, as used herein, thus refers to the set of all control options and parameters for the object (e.g., coherence information, origin server identity information, load balancing information, customer code, other control codes, etc.), and such information may be provided to the CDN content servers via a configuration file, in HTTP headers, or in other ways. A configuration file is advantageous as it enables a change in the metadata to apply to an entire domain, to any set of directories, or to any set of file extensions. In one approach, the CDNSP operates a metadata transmission system 116 comprising a set of one or more servers to enable metadata to be provided to the CDNSP content servers. The system 116 may comprise at least one control server 118, and one or more staging servers 120a–n, each of which is typically an HTTP server (e.g., Apache). Metadata is provided to the control server 118 by the CDNSP or the content provider (e.g., using a secure extranet application) and periodically delivered to the staging servers 120a–n. The staging servers deliver the metadata to the CDN content servers as necessary.

Figure 7:
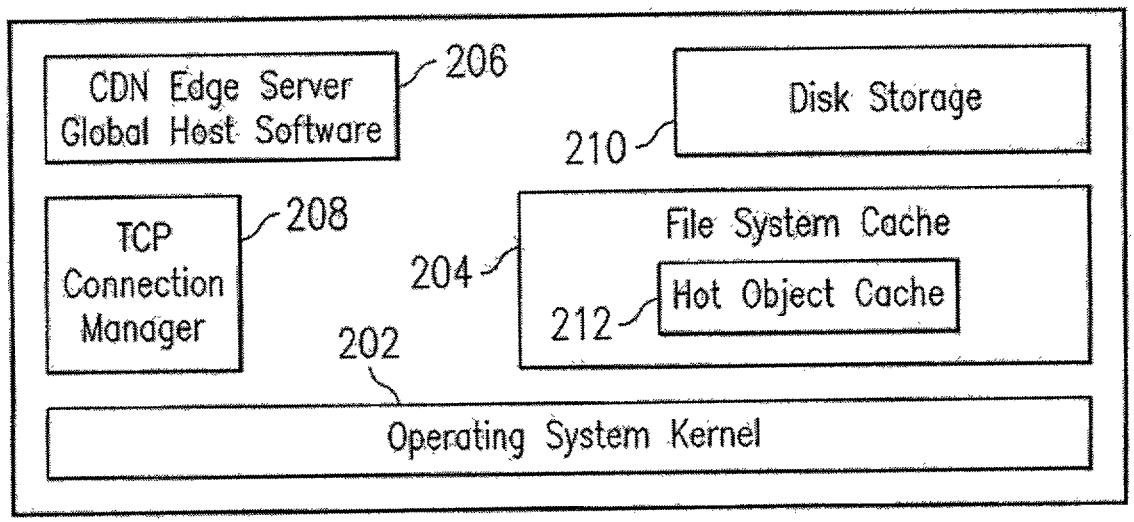
FIG. 7 is a block diagram of a representative CDN content server on which the secure, unattended operating system installation is implemented according to the present invention.

FIG. 7 illustrates a typical machine configuration for a CDN content edge server. Typically, the content server 200 is a caching appliance running an operating system kernel 202, a file system cache 204, CDN global host (or "ghost") software 206, TCP connection manager 208, and disk storage 210. CDN ghost software 206, among other things, is used to create and manage a "hot" object cache 212 for popular objects being served by the CDN. In operation, the content server 200 receives end user requests for content, determines whether the requested object is present in the hot object cache or the disk storage, serves the requested object via HTTP (if it is present) or establishes a connection to another content server or an origin server to attempt to retrieve the requested object upon a cache miss.

The request-routing mechanism allocates servers in the content delivery infrastructure to requesting clients in a way that minimizes a given client's response time. The distribution infrastructure consists of on-demand or push-based mechanisms that move content from the origin server to the surrogates. An effective CDN serves frequently accessed content from a surrogate that is "best-suited" for a given requesting client.

In a typical CDN, a single service provider operates the request-routers, the surrogates, and the content distributors. In addition, that service provider establishes (business)

relationships with content publishers and acts on behalf of their origin server sites to provide a distributed delivery system. A well-known commercial CDN is FreeFlow, which is available from Akamai Technologies, Inc. of Cambridge, Mass.

According to the present scenario, it is assumed that CDN machines in the deployed network are already operating with a first operating system, e.g., Linux, and that the CDN system operator desires to install a second operating system, e.g., Windows 2000, on some of the deployed machines while the latter machines are running the first operating system. Of course, the operating systems identified are merely representative. Generalizing, it is assumed that the CDN machines in the field are running operating system A and that it is desired to replace operating system A "on-the-fly" with operating system B. An exemplary technique for accomplishing this process is set forth below:

Step 1. Generate two installation bundles, one for operating system A and one for operating system B.

Step 2. Place these bundles on a visible HTTP (WWW) server, which may be referred to herein as a staging server. Typically, the staging server is secure.

Step 3. As noted above, it is assumed that the CDN servers in the network are deployed to the field running operating system A. Preferably, each server is an Intel-commodity server (such as a Pentium II or Pentium III-class machine) and includes RAM and two (2) or more hard disk drives. Operating system A is installed on the first disk drive, and the additional hard drives are used for auxiliary storage as will be described.

In this step, the CDN server targeted to be installed with operating system B is selected. In one embodiment, this is accomplished as follows. A command is executed remotely on the target machine to retrieve the installation bundles via the Web from the staging server. In a specific exemplary embodiment, the CDN itself is used to expedite the delivery to the target machine of the installation bundles, although this is not a requirement.

These particular installation bundles are large, but the number of times they must be transmitted over the Internet is minimized by such use of the CDN. Thus, in a specific aspect, the bundles are sent over the Internet (using the CDN) only once per target data center where the CDN server(s) are located. Typically, a set of CDN servers will be co-located in the data center and, thus, multiple servers can use a given operating system download.

Step 4. After the installation bundles are delivered, a series of commands are executed remotely on the target server as follows:

4.1 Divide the first unused hard disk on the target server into two partitions. The first partition will contain the operating system; the second, larger partition will be used for temporary storage during the conversion.

4.2 Unpack the operating system A bundle onto the first partition of drive two. Move the operating system B bundle onto the second (storage) partition of drive two.

4.3 Modify the boot loader to boot operating system A from disk 2, partition 1.

4.4 Remotely reboot the target server.

4.5 When the server is rebooted and running operating system A from disk 2, a script is executed that removes the previously used partitions and operating system A from disk drive 1.

4.6 The script then creates at least one partition on disk 1 to contain operating system B.

4.7 The operating system B bundle is exploded onto the target partition on disk 1.

4.8 Settings such as the TCP/IP network configuration previously used by operating system A are preserved by the script, e.g., by modifying operating system B's configuration before it is run for the first time. Thus, when the server is rebooted and running operating system B, it can be reached at the same TCP/IP address used earlier by operating system A. Additionally, the script preserves the security settings used to control access to the machine.

4.9 The boot-loader is reconfigured to boot operating system B from disk 1.

4.10 The script reboots the target server.

4.11 The target server is running operating system B to complete the installation process.

Preferably, the operating system being delivered to the target server is compressed and encrypted in an encryption wrapper. In such case, the installation process will also include the steps of decrypting the wrapper (to remove the encryption) and decompressing the file (to remove the compression). Of course, one of ordinary skill in the art will appreciate that operating systems A and B may simply be two different versions of the same operating system. Moreover, one of ordinary skill will appreciate that the present system is not limited to use with a CDN or with respect to remote installation of operating systems for CDN servers.

The following is a more detailed description of how a Windows 2000 operating system is installed onto a deployed network of Linux-based servers in the Akamai FreeFlow CDN.

An unattended Windows 2000 installation process is used to install the Windows 2000 operating system onto machines that are already in the field. These machines are at one of the various kinds of co-locations sites that house various servers.

Deployed machines can arrive at a co-location site pre-installed with a customized Linux distribution installed. The Windows 2000 installation procedure is designed to be launched remotely while the machine is running Linux, allowing one to install Windows 2000 on any existing deployed machine. Installations are performed using the real-mode Windows 2000 Installer.

The installation process begins using Netdeploy to deliver conversion tarballs to the target server. Two tarballs containing a Linux System Installation (LSI) distribution that will be installed on the second disk, and a large tarball containing the Windows 2000 OS and tools, are installed on the target machine using Netdeploy. A network deployment routine optimizes the delivery time of these tarballs, e.g, by using the content delivery network for transmission.

The network deployment routine then repartitions the second disk on the target machine, installs the LSI distribution there, and copies the Windows 2000 install tarball to the second disk. The deployment routine then reboots the machine, this time into the LSI installation on disk two. When LSI boots, the deployment routine repartitions disk one, creating a FAT file system that will be used to host the Windows 2000 installation. The Windows 2000 OS tarball is unpacked onto this partition.

Disk one now contains the following: a copy of the Windows 2000 Server distribution, in /I386 autoinst.txt, The Answer File used by the Windows 2000 Installer instcdn.cmd, a script that will be executed later by OEM-Preinstall a tarball containing all the Akamai software for the machine a Windows Registry Editor importable file containing all the registry values needed by Akamai miscellaneous scripts used by instcdn.cmd MSDOS system files (io.sys, command.com)

The script next modifies machine-specific parameters in the Autoinst.txt file, including the "ComputerName" and Network Adapter Sections.

Finally, the script runs lilo once with each of two configuration files. For the first disk, lilo adds boot entries for both Windows (the default) and Linux (using /dev/sdb as the boot device). Phase two then extracts the MBR from disk two into a file on the new FAT file system that can later by used to make the NT Boot Loader boot the Linux installation on the second disk.

The machine is then rebooted into DOS via lilo. The config.sys and autoexec.bat files are processed, leading the HIMEM.SYS driver and starting SMARTDRV.EXE. Autoexec.bat then starts winnt.exe, with the /wautoinst.txt argument, instructing it to process an Answer File. Winnt.exe copies files from I386 into the staging directory. Because this is a FAT file system, and there are thousands of files to be copied, the length of time required to copy the files would be about twenty times longer without SMARTDRV. Once the distribution files are copied, winnt.exe installs the NT boot loader.

The machine is then rebooted, a skeletal Windows 2000 installation is booted, and the remaining stages of the installation are executed. The rest of the installation will be a mostly uneventful unattended Windows 2000 installation, with a few highlights.

The ExtendOEMPartition option specified in the autoinst.txt file causes the installer to stretch the 2048 MB FAT file system to fit the size of the disk being installed. Preferably, the extension happens just after the NFTS conversion.

The ComputerType option explicitly specifies the type of HAL to be used.

The ProductID key specifies the Microsoft Product Identification Number to be used to identify the license for this Windows 2000 installation.

The SFCDisable key instructs Windows to disable the "System File Cache."

After a deployed server is converted to Windows 2000, it is also possible to boot the server back into Linux, so that Windows 2000 can be reinstalled from scratch, or so the machine may be reclaimed for use as a Linux server. This capability is accomplished by manipulating the Windows 2000 boot loader.

It should be noted that the portions of the preceding diagrams and accompanying descriptions may be joined and used with one another in many different combinations. This specification should be construed as describing the various combinations of dynamic interaction between the underlying functional units described.

Additionally, the described system can be implemented in hardware, or in software. Such software can take the form of scripts, executables, or programs that run in a system independent manner, such as those written in the Java programming language. Additionally, any combination of hardware and software may be used to implement any portion of the described system.

As such, a method and apparatus for updating operating systems across a network is described. In view of the above detailed description and associated drawings, other modifications and variations will now become apparent to those skilled in the art. It should also be apparent that such other modifications and variations might be effected without departing from the spirit and scope of the present invention as set forth in the claims, which follow.

Accordingly, we claim:

1. A method of replacing a first operating system executing on a computer having a storage, the storage having at least first and second bootable regions, wherein the first operating system was booted from the first bootable region, the method comprising the steps of:
   remotely re-booting the computer to boot a copy of the first operating system located on the second bootable region;
   removing the first operating system from the first bootable region;
   copying a second operating system onto the first bootable region; and
   remotely re-booting the computer to boot the second operating system from the first bootable region.

2. The method as described in claim 1 wherein the second bootable region has first and second sub-regions, wherein the copy of the first operating system is located in the first sub-region of the second bootable region and the second operating system is copied onto the first bootable region from the second sub-region of the second bootable region.

3. The method as described in claim 2 further including the step of delivering the copy of the first operating system and the second operating system to the computer.

4. The method as described in claim 3 wherein the copy of the first operating system is delivered to the computer in a compressed format.

5. The method as described in claim 3 wherein the second operating system is delivered to the computer in a compressed format.

6. The method as described in claim 4, the method further comprising the step of decompressing the copy of the first operating system prior to copying a second operating system onto the first bootable region.

7. A method of replacing a first operating system executing on a server having first and second storage disks, wherein the first operating system is booted from the first storage disk, comprising the steps of:
   receiving, from a remote location, (i) a packed version of the first operating system and (ii) a packed version of a second operating system desired to be installed on the server;
   unpacking the first operating system onto a first storage partition of the second disk;
   storing the packed version of the second operating system onto a second storage partition of the second disk;
   remotely re-booting the server to boot the first operating system from the first storage partition of the second disk;
   removing the first operating system from the first disk;
   unpacking the second operating system onto a partition on the first disk; and
   remotely re-booting the server to boot the second operating system from the partition on the first disk.

8. The method as described in claim 7 wherein the step of remotely re-booting the server to boot the first operating system comprises:
   modifying a boot loader of the server to boot the first operating system from the first storage partition of the second disk.

9. The method as described in claim 8 wherein the step of remotely re-booting the server to boot the second operating system comprises:
   reconfiguring the boot loader to boot the second operating system from the partition on the first disk.

10. The method as described in claim 7 wherein the packed version of the first operating system is encrypted.

11. The method as described in claim 10, further comprising decrypting the packed version prior to the step of:
   unpacking the first operating system onto a first storage partition.

12. The method as described in claim 7 wherein the step of removing the first operating system from the first disk removes any previously used partitions on the first disk.

13. The method as described in claim 7, further comprising:
   preserving network configuration data used by the first operating system to enable the server executing the second operating system following the step of rebooting the server to operate under the second operating system to be reached at a network address used by the server executing the first operating system.

14. The method as described in claim 7, further comprising:
   preserving security data used to control access to the server executing the first operating system to enable the server executing the second operating system following the step of rebooting the server to operate under the second operating system to be accessed using at least one security setting used by the server executing the first operating system.

15. The method as described in claim 7 wherein the packed versions of the first operating system and the second operating system are received over a content delivery network.

16. The method as described in claim 7 wherein the first operating system is a Linux-based operating system and the second operating system is a Windows-based operating system, or vice-versa.

17. A method of replacing a first operating system executing on a computer having a storage, the storage having at least first and second bootable regions, wherein the first operating system was booted from the first bootable region, comprising the steps of:

remotely re-booting the computer to boot a copy of a second operating system located on the second bootable region;
   removing the first operating system from the first bootable region;
   copying a third operating system onto a bootable region other than the second bootable region; and
   remotely re-booting the computer to boot the third operating system from the bootable region other than the second bootable region.

18. In a content delivery network having a set of content servers for caching and serving content on behalf of participating content providers, a method of replacing a first operating system executing on a content server having first and second storage disks, wherein the first operating system is booted from the first storage disk, comprising the steps of:

(a) delivering, over the content delivery network: (i) a packed version of the first operating system and (ii) a packed version of a second operating system desired to be installed on the content server;
   (b) unpacking the first operating system onto a first storage partition of the second disk;
   (c) storing the packed version of the second operating system onto a second storage partition of the second disk;
   (d) remotely re-booting the content server to boot the first operating system from the first storage partition of the second disk;
   (e) removing the first operating system from the first disk;
   (f) unpacking the second operating system onto a partition on the first disk; and
   (g) remotely re-booting the content server to boot the second operating system from the partition on the first disk.

* * * * *